Dec. 13, 1927.
O. B. CLARK
1,652,763
BRAKE SHOE
Filed Aug. 2, 1926
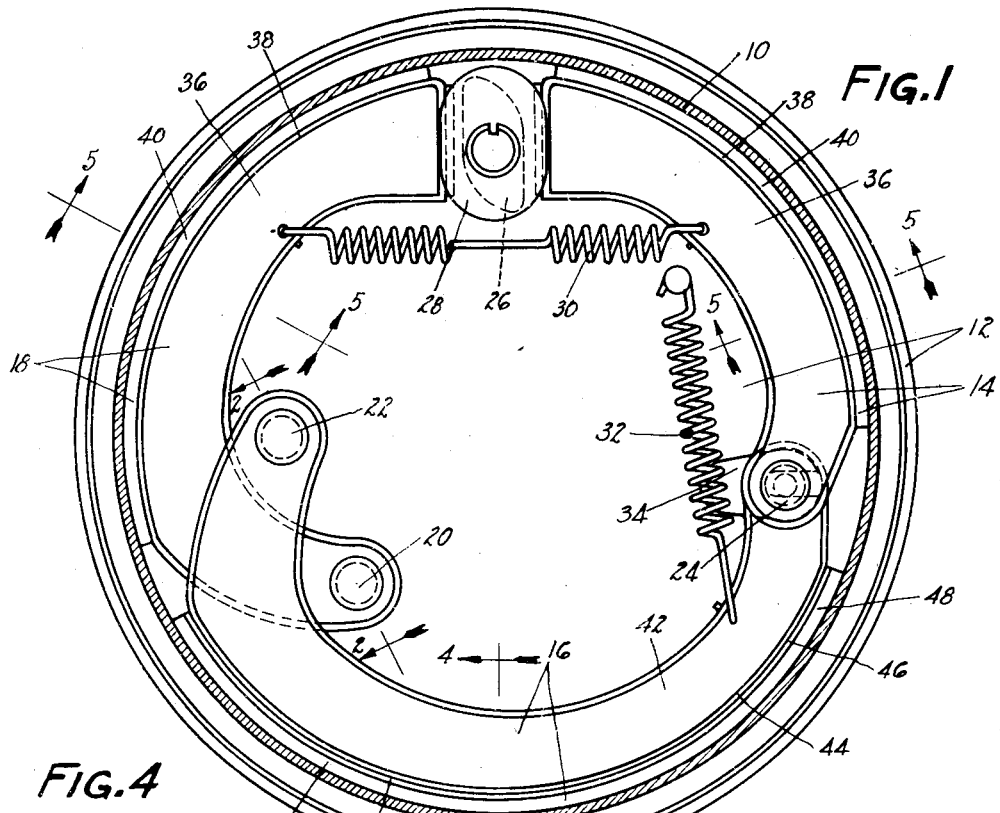
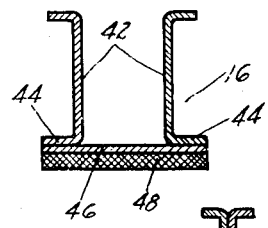
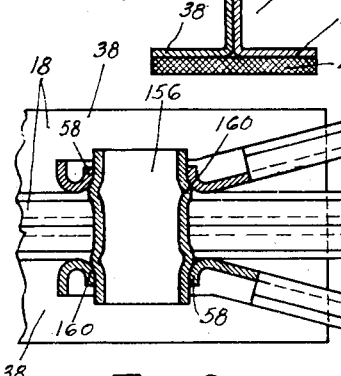
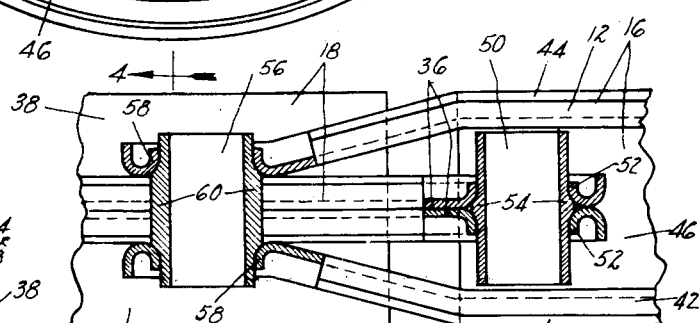
INVENTOR
OTTO B. CLARK
BY
ATTORNEY Patented Dec. 13, 1927.

1,652,763

UNITED STATES PATENT OFFICE.

OTTO B. CLARK, OF EVANSVILLE, INDIANA, ASSIGNOR TO BENDIX BRAKE COMPANY, OF CHICAGO, ILLINOIS, A CORPORATION OF ILLINOIS.

BRAKE SHOE.

Application filed August 2, 1926. Serial No. 126,364.

This invention relates to brakes, and is illustrated as embodied in shoes for an internal expanding automobile brake. An important object of the invention is to provide a very strong pivot mounting for the shoe, suitable for heavy brakes for motor trucks and the like, by permanently securing to the shoe a bushing for the pivot.

Preferably the bushing is welded in place, and in one desirable arrangement the pivoted parts of the shoe have tubular flanges sleeved on the bushing and welded thereto at their edges. I also prefer to form the bushing with shoulders seated against the inner sides of said parts (i. e. against the bases of the flanges), for example by rolling or otherwise distorting the bushing wall to form annular ridges.

The above and other objects and features of the invention, including various novel and desirable details of construction, will be apparent from the following description of the illustrative embodiments shown in the accompanying drawings, in which:

Figure 1 is a vertical section through the brake, just inside the head of the drum, showing the shoes in side elevation;

Figure 2 is a section, on the line 2—2 of Figure 1, through adjacent ends of two of the shoes, showing the mounting of the bushings;

Figure 3 is a view corresponding to Figure 2, but showing bushings of a modified form;

Figure 4 is a section through one of the shoes on the line 4—4 of Figure 1; and

Figure 5 is a section through one of the other shoes on the line 5—5 of Figure 1.

The brake selected for illustration comprises a drum 10, at the open side of which there may be a backing plate 12, and within which are arranged brake shoes 14, 16, and 18. Shoe 18 is anchored on a pivot 20 and shoe 16 on a pivot 22, while shoe 14 is connected to shoe 16 by a pivot 24.

The brake is applied by means such as a double cam 26, shown with an end flange 28 laterally confining the free ends of shoes 14 and 18, the cam acting to force the shoes apart against the resistance of a return spring 30. Shoe 16 is applied by shoe 14, against the resistance of an auxiliary return spring 32. The idle position of pivot 24 may be determined by any suitable stop 34 cooperating with spring 32.

Each of the shoes 14 and 18, as illustrated in Figure 5, may be made of two stampings riveted or otherwise secured back to back, and comprising two plane or radial flanges 36 jointly forming a stiffening web, and two oppositely-directed cylindrical flanges 38 forming the friction face and carrying the brake lining 40. Flanges 36 of shoe 18 are offset within the curve of the shoe at the lower end (Figure 1) to form an anchoring arm.

Shoe 16 comprises a pair of spaced-apart and generally parallel stampings 42 having outer cylindrical flanges 44, to which is riveted or welded a band or friction face 46 carrying the brake lining 48. Stampings 42 project beyond the ends of band 46 to form spaced arms straddling the ends of shoes 14 and 18, the arms at the left (Figure 1) being offset within the curve of the shoe to be mounted on pivot 22.

The present invention relates to forming the shoes in a novel manner to provide them with bushings, as for example for pivots 20 and 22, whether or not the shoes are used in the particular brake described above.

As shown in Figure 2, there are alined openings in flanges 36 for a bushing 50 for pivot 20 of shoe 18, the metal about the openings being drawn in opposite directions from the center of the shoe to form coaxial tubular flanges 52 welded at their edges to the bushing. The bushing is thickened at 54 at its center to form oppositely-directed shoulders seated against the bases of flanges 52.

Stampings 42 of shoe 16, which may converge somewhat at the anchored end of the shoe in a relatively wide shoe such as the one illustrated (Figure 2), are also provided with alined openings sleeved on a bushing 56 for pivot 22, the metal about the openings being drawn in opposite directions from the center of the shoe to form coaxial tubular flanges 58 welded at their edges to the bushing. Bushing 56 also is thickened at 60 in its central portion to form oppositely-directed shoulders seated against the bases of the flanges 58.

The construction of Figure 3 differs from that of Figure 2 in that bushings 150 and 156, corresponding to bushings 50 and 56, have walls of uniform thickness, and may thus be sections cut from a long piece of tubing. Beads or ridges 154 and 160 are rolled in the bushing walls to form the shoulders seated against flanges 52 and 58, or the walls may be distorted to form the ridges in any other desired manner.

While particular embodiments of the invention have been described in detail, it is not my intention to limit its scope to those particular embodiments, or otherwise than by the terms of the appended claims.

I claim:

1. A brake shoe arranged to be mounted on a pivot and having two parts formed with coaxial oppositely-directed tubular flanges, in combination with a cylindrical separate bushing for the pivot sleeved in said flanges and having a wall of substantially uniform thickness, said bushing wall being distorted to form annular shoulders seated against the bases of said flanges.

2. A brake shoe arranged to be mounted on a pivot and having two parts formed with coaxial openings, in combination with a cylindrical separate bushing for the pivot sleeved in said openings and having a wall of substantially uniform thickness, said bushing wall being distorted to form annular shoulders seated against the inner sides of said parts.

3. A brake shoe arranged to be mounted on a pivot and having spaced parts formed with alined openings, in combination with a separate bushing for the pivot sleeved in said openings and having a wall of substantially uniform thickness, said bushing wall being distorted to form two outwardly-directed annular ridges forming shoulders engaging the inner faces of said parts.

In testimony whereof, I have hereunto signed my name.

OTTO B. CLARK.